United States Patent
Lee

(10) Patent No.: US 7,593,214 B2
(45) Date of Patent: Sep. 22, 2009

(54) ARRAY TYPE MULTI-LAYER CERAMIC CAPACITOR AND PRODUCTION METHOD THEREOF

(75) Inventor: Kwi-Jong Lee, Seoul (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 232 days.

(21) Appl. No.: 11/345,407

(22) Filed: Feb. 2, 2006

(65) Prior Publication Data

US 2006/0221542 A1   Oct. 5, 2006

(30) Foreign Application Priority Data

Mar. 30, 2005   (KR) .................. 10-2005-0026495

(51) Int. Cl.
*H01G 4/30*   (2006.01)

(52) U.S. Cl. .................. 361/301.4; 361/303; 361/305; 361/311; 361/321.2; 361/306.1

(58) Field of Classification Search ............. 361/301.4, 361/321.1, 321.2, 311–313, 306.1, 306.3, 361/301.1, 301.2, 303–305
See application file for complete search history.

(56) References Cited

U.S. PATENT DOCUMENTS

| | | | | |
|---|---|---|---|---|
| 5,144,527 | A * | 9/1992 | Amano et al. | 361/321.2 |
| 5,583,738 | A * | 12/1996 | Kohno et al. | 361/312 |
| 6,934,145 | B2 * | 8/2005 | Hsieh et al. | 361/321.2 |
| 7,426,113 | B2 * | 9/2008 | Ikeno et al. | 361/752 |
| 7,505,247 | B2 * | 3/2009 | Lee | 361/303 |
| 2004/0145858 | A1 * | 7/2004 | Sakurada | 361/600 |

FOREIGN PATENT DOCUMENTS

| | | |
|---|---|---|
| CN | 1342555 A | 4/2002 |
| JP | 1995-235441 A | 9/1995 |
| JP | 7-235441 | 3/1997 |
| JP | 2002-100543 | 4/2002 |
| JP | 2002-100543 A | 4/2002 |
| KR | 10-403120 | 10/2003 |

OTHER PUBLICATIONS

Korean Office Action dated Jun. 26, 2006 issued in KR 2005-26495.
Japanese Office Action issued Dec. 18, 2008 in 2006-027783.
Chinese Office Action issued Dec. 5, 2008 in CN 200610003169.8.

* cited by examiner

*Primary Examiner*—Nguyen T Ha
(74) *Attorney, Agent, or Firm*—Stanzione & Kim LLP

(57) ABSTRACT

A method of producing an array type multi-layer ceramic capacitor is disclosed, comprising: forming dielectric films, forming dielectric sheets on which internal electrodes and interelectrode dielectrics formed on the same plane as the internal electrodes are printed simultaneously by spraying ink intended for internal electrodes and ink intended for dielectrics onto the dielectric film via a plurality of inkjet printer heads, stacking and compressing the dielectric sheets, cutting the stacked dielectric sheet to include a plurality of internal electrodes on the same plane as the dielectric sheet, and sintering the cut dielectric sheets. The array type multi-layer ceramic capacitor according to the invention can solve the problem of interlayer gaps by printing the dielectrics and internal electrodes simultaneously, and can solve the contact problem by printing the internal electrode and the external electrode as a single body.

12 Claims, 11 Drawing Sheets

ARRAY TYPE MULTI-LAYER CERAMIC CAPACITOR AND PRODUCTION METHOD THEREOF

CROSS-REFERENCE TO RELATED APPLICATIONS

This application claims the benefit of Korean Patent Application No. 2005-26495 filed with the Korea Industrial Property Office on Mar. 30, 2005, the disclosure of which is incorporated herein by reference.

BACKGROUND OF THE INVENTION

1. Field of the Invention

The present invention relates to an electronic component, and in particular to a multi-layer ceramic capacitor and a production method thereof.

2. Description of the Related Art

The multi-layer ceramic capacitor (MLCC) is an electronic component formed by stacking several layers of capacitors, and performs various functions such as blocking DC signals, bypassing, and frequency resonance, etc. With the gradual expansion of the portable terminal market due to the personalization of electronic products, the multi-layer ceramic capacitor is becoming smaller and lighter.

Recently, the array type multi-layer ceramic capacitor is being used, in which several multi-layer ceramic capacitors are placed on a chip in the form of an array. As the array type multi-layer ceramic capacitor may replace multiple multi-layer ceramic capacitors, it can reduce mounting area, time, and cost, when compared to using multi-layer ceramic capacitors individually.

In prior art, the array type multi-layer ceramic capacitor is produced by a process of printing electrode paste on a green sheet by a printing technique such as screen printing, flexo printing, and gravure printing, etc., sintering at high temperatures after stacking in multiple layers and cutting, and then coating and sintering the external electrode for plating.

Here, since the internal electrode is printed over the printed dielectric sheet, interlayer gaps are formed when stacking multiple layers of dielectric sheets due to the thickness of the internal electrodes. In FIG. 1, dielectrics 110 and internal electrodes 120 are illustrated in a cross sectional view of an array type multi-layer ceramic capacitor, wherein interlayer gaps g are formed due to the thickness of the internal electrodes 120 between the dielectrics 110. To overcome this problem of interlayer gaps, methods of reducing the thickness of internal electrodes may be proposed, but there is a limit to how much the thickness of internal electrodes may be reduced.

Also, the production process of array type multi-layer ceramic capacitors comprises casting, printing, stacking, compressing, cutting, polishing and external electrode processes, as described above. Thus, when the dielectric sheets are not properly joined, a problem of delamination occurs, wherein each layer of the dielectric sheets are separated. Further, as internal electrodes and external electrodes are generated by separate processes, a problem occurs of poor contact between the internal electrodes and the external electrodes.

SUMMARY OF THE INVENTION

The invention provides an array type multi-layer ceramic capacitor and a production method thereof, which can solve the problem of interlayer gaps by printing dielectrics and internal electrodes simultaneously.

Also, the invention provides an array type multi-layer ceramic capacitor and a production method thereof, which can improve the adhesion between dielectric sheets during stacking.

Further, the invention provides an array type multi-layer ceramic capacitor and a production method thereof, which can solve the contact problem by printing internal electrodes and external electrodes as single bodies.

In addition, the invention provides an array type multi-layer ceramic capacitor and a production method thereof, which can reduce the production process by printing internal electrodes and external electrodes simultaneously.

Additional aspects and advantages of the present general inventive concept will be set forth in part in the description which follows and, in part, will be obvious from the description, or may be learned by practice of the general inventive concept.

According to an aspect of the invention, a method of producing an array type multi-layer ceramic capacitor may be provided, comprising: (a) forming dielectric films, (b) forming dielectric sheets, on which internal electrodes and interelectrode dielectrics formed on the same plane as the internal electrodes are printed simultaneously by spraying ink intended for internal electrodes and ink intended for dielectrics onto the dielectric film via a plurality of inkjet printer heads, (c) stacking and compressing the dielectric sheets, (d) cutting the stacked dielectric sheet to include a plurality of internal electrodes on the same plane as the dielectric sheet, and (e) sintering the cut dielectric sheets.

Here, the dielectric film may be formed using a dielectric slurry or by spraying dielectric ink using the inkjet printer heads.

Also, the cutting lines by which the dielectric sheet is cut may be parallel to the internal electrodes and may bisect the interelectrode dielectrics.

Further, during the cutting (d), the number of internal electrodes included in the same plane as the dielectric sheet may be two or four.

Also, the plurality of inkjet printer heads comprise an inkjet printer head intended for internal electrodes which spray the ink intended for internal electrodes and an inkjet printer head intended for dielectrics which spray the ink intended for dielectrics.

Here, the inkjet printer head intended for internal electrodes and the inkjet printer head intended for dielectrics may spray ink while moving synchronously or may spray ink while moving separately in correspondence to different operational control signals.

According to another aspect of the invention, a method of producing an array type multi-layer ceramic capacitor may be provided, comprising: forming dielectric sheets, on each of which are printed a first external electrode, a dielectric joined to the first external electrode and subsided with a face thereof exposed, an internal electrode formed in the subsided portion of the dielectric, and a second external electrode formed to join as a single body with the internal electrode, stacking and compressing the dielectric sheets alternately so that the first external electrodes and the second external electrodes are symmetrical and thus electrically connected with each other, cutting the stacked dielectric sheet to include a plurality of the internal electrodes on the same plane as the dielectric sheet, and sintering the cut dielectric sheets.

According to yet another aspect of the invention, an array type multi-layer ceramic capacitor may be provided, comprising a plurality of dielectric sheets on each of which are printed a first external electrode, a dielectric joined to the first external electrode and subsided with a face thereof exposed, an internal electrode formed in the subsided portion of the dielectric, and a second external electrode formed to join as a single body with the internal electrode, wherein the first external electrode, the internal electrode, and the second external electrode are aligned in preconfigured numbers and in predetermined intervals, and the dielectric sheets are stacked alternately so that the first external electrodes and the second external electrodes are symmetrical to be electrically connected with each other.

Here, the first external electrode, the internal electrode, and the second external electrode may be printed simultaneously by an inkjet technique, and the inkjet technique may be a technique of spraying ink intended for electrodes and ink intended for dielectrics using a plurality of inkjet printer heads.

The first external electrode, the internal electrode, and the second external electrode may be formed with different types of material, and the number of internal electrodes included in the same plane as the dielectric sheet may be two or four.

According to still another aspect of the invention, an array type multi-layer ceramic capacitor may be provided that is produced by the foregoing methods of producing an array type multi-layer ceramic capacitor.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
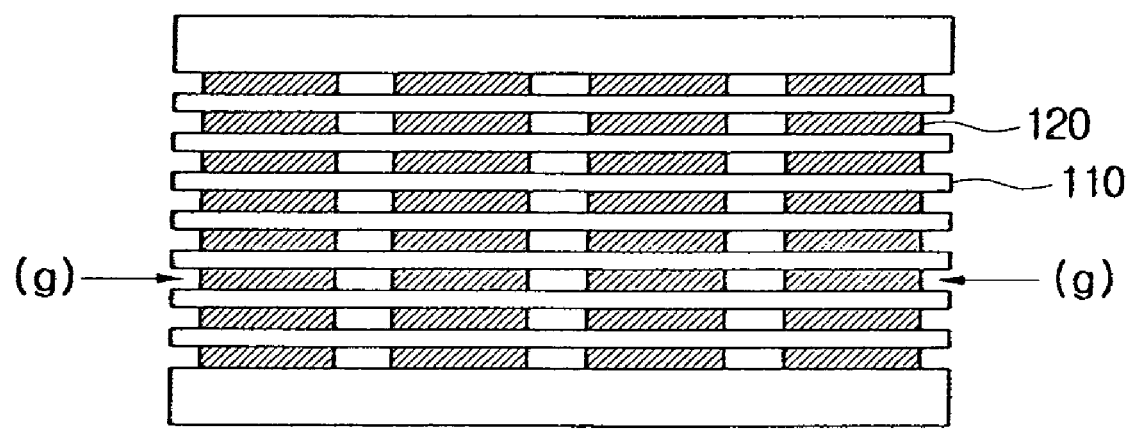
FIG. 1 illustrates interlayer gaps created by internal electrodes in an array type multi-layer ceramic capacitor according to prior art.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

The array type multi-layer ceramic capacitor consists of a plurality of multi-layer ceramic capacitors, each multi-layer ceramic capacitor comprising a dielectric, an internal electrode, and an external electrode. The dielectric is the external body portion of the array type multi-layer ceramic capacitor, and since it is made of a ceramic material, it is generally called a ceramic body. In general, $BaTiO_3$ (Barium Titanate, BT) is used as the dielectric, which has a high permittivity at normal temperature. The sintering temperature of BT powder used as the dielectric is about 1250° C. p The internal electrode is a conductive matter positioned within the dielectric. Palladium (Pd), nickel (Ni), and copper (Cu), etc. are generally used as the material for the internal electrode. The melting temperatures of palladium (Pd), nickel (Ni), and copper (Cu), the materials for the internal electrode, are 1555° C., 1452° C., and 1083° C., respectively.

The external electrode is a conductive matter which connects the array type multi-layer ceramic capacitor to an outside power source. As the array type multi-layer ceramic capacitor is an element designed to be mounted on the surface of a substrate, not only does the external electrode play the simple role of connecting to an outside power source, but also it aids the adhesion of solder when mounting onto the substrate.

Figure 2:
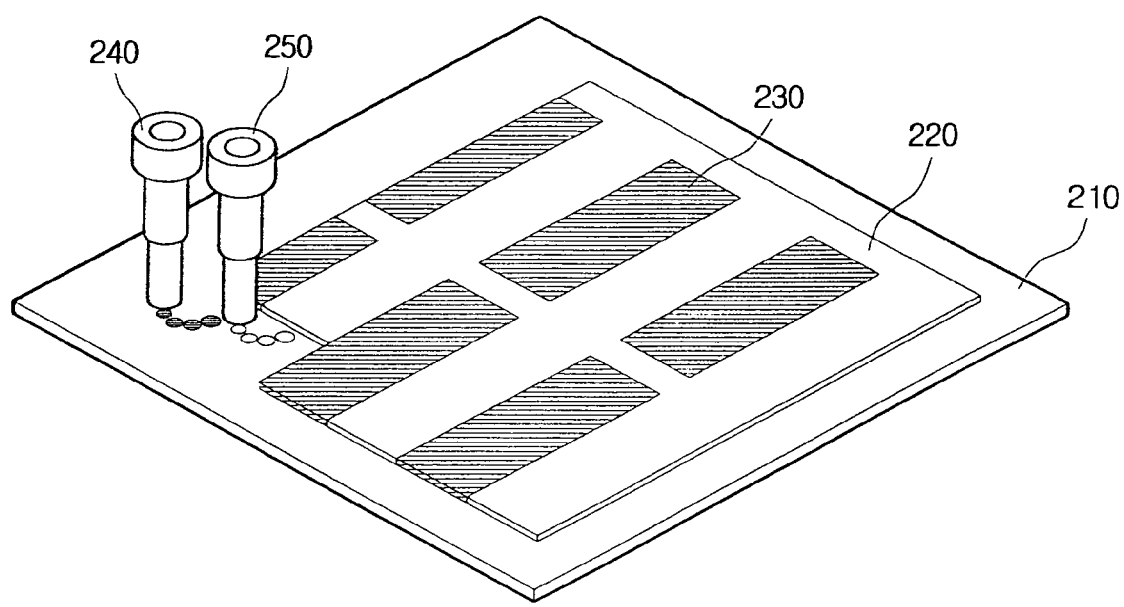
FIG. 2 illustrates a method of printing dielectrics and electrodes simultaneously by an inkjet technique according to a preferred embodiment of the invention.

FIG. 2 illustrates a method of printing dielectrics and electrodes simultaneously by an inkjet technique using an inkjet printer head according to a preferred embodiment of the invention. As seen in FIG. 2, an inkjet printer head 240 intended for electrodes and an inkjet printer head 250 intended for dielectrics form the electrodes 230 and the dielectric 220, respectively, on the carrier film 210.

The inkjet printer head 240 intended for electrodes and the inkjet printer head 250 intended for dielectrics spray ink intended for electrodes and ink intended for dielectrics, respectively. The ink for electrodes may contain metal powder such as palladium (Pd), nickel (Ni), copper (Cu), tungsten (W), and molybdenum (Mo), binders, and solvents, and the ink for dielectrics may contain BT powder, binders, and solvents. Here, when printing the ink intended for electrodes and ink intended for dielectrics simultaneously, immiscible solvents may be used so that two are not mixed with each other.

The simultaneous printing of the dielectric 220 and the electrodes 230 by an inkjet technique described herein refers not only to the spraying of the ink intended for electrodes and ink intended for dielectrics during the same time period, but also to using a plurality of inkjet printer heads to print the dielectric 220 and the electrodes 230 according to a preconfigured program and pattern. Therefore, the dielectric 220 and the electrodes 230 may be printed together or printed in the same pass. For example, in FIG. 2, the inkjet printer head 240 for electrodes and the inkjet printer head 250 for dielectrics move synchronously facing the carrier film 210 and print the electrodes 230 and the dielectric 220 simultaneously. Here, the inkjet printer head 240 for electrodes halts its operation at parts where only the dielectric 220 is printed, and only the inkjet printer head 250 for dielectrics sprays the ink for dielectrics.

The inkjet printer head 240 for electrodes and the inkjet printer head 250 for dielectrics may be heads in an inkjet printer device for spraying ink. For example, an inkjet printer device may comprise a support which holds the device, an inkjet printer head which sprays ink to print the electrodes and the dielectric on a carrier film 210 according to a preconfigured pattern, a moving device which moves the inkjet printer head over the carrier film 210, and a circuit part which executes a program controlling the inkjet printer head to spray ink according to a preconfigured pattern, etc.

Here, the inkjet printer head 240 for electrodes and the inkjet printer head 250 for dielectrics may spray ink while moving synchronously. In other words, they may print the electrodes and the dielectric while moving together on the same path according to a preconfigured pattern. When the heads are moved together, the electrodes and the dielectric may be printed according to a preconfigured pattern by controlling the starting point, and amount, etc. of the ink sprayed for each head. In another embodiment, the inkjet printer head 240 for electrodes and the inkjet printer head 250 for dielectrics may spray ink while moving separately in correspondence to different operational control signals. In other words, each head may be mounted on a device or separate devices, each receiving different operational control signals from different programs and performing corresponding operations thereto.

Figure 3:
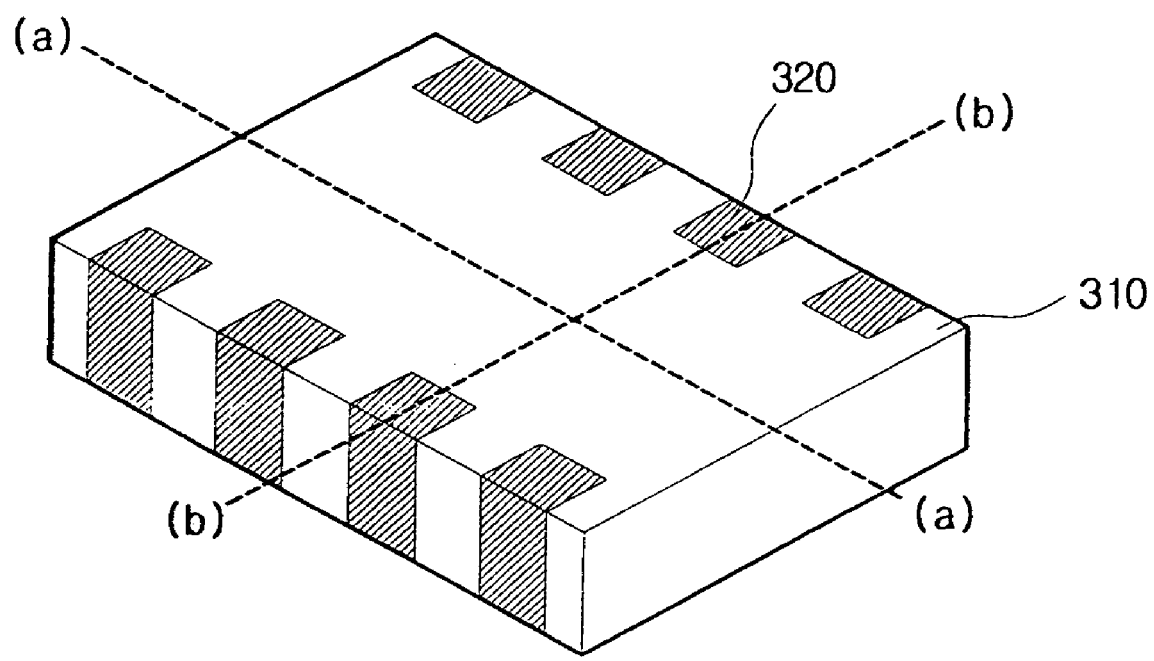
FIG. 3 is a perspective view of an array type multi-layer ceramic capacitor according to a preferred embodiment of the invention.

The array type multi-layer ceramic capacitor comprises a predefined number of multi-layer ceramic capacitors, each acting as a separate capacitor, on one chip; FIG. 3 illustrates dielectrics 310 and external electrodes 320; and the array type multi-layer ceramic capacitor comprises four multi-layer ceramic capacitors. Here, each multi-layer ceramic capacitor included in the array type multi-layer ceramic capacitor may each have the same electric capacity or different electric capacities. Each of the multi-layer ceramic capacitors may be given a different electric capacity by controlling the print patterns for the internal electrodes and the dielectrics. That is, each of the multi-layer ceramic capacitors may be given a different electric capacity by making the thickness of a dielectric formed between internal electrodes different from the thickness of the dielectric formed between internal electrodes adjacent in the direction in which the dielectric sheets are stacked, or by making the thicknesses of the internal electrodes different. Further, each multi-layer ceramic capacitor may be given a different electric capacity also by making the permittivities of the dielectrics formed between internal electrodes different in the direction in which the dielectric sheets are stacked.

The foregoing description explained figures that illustrate an array type multi-layer ceramic capacitor and production method thereof in general, and hereafter, the array type multi-layer ceramic capacitor and production method thereof according to the invention will be explained focusing on specific embodiments and with reference to the accompanying drawings. Two major embodiments of the invention are provided: the first relating to a method of simultaneously printing internal electrodes and interelectrode dielectric formed on the same plane as the internal electrodes by an inkjet technique, and the second relating to a method of simultaneously printing internal electrodes and external electrodes by an inkjet technique. The two embodiments will be described hereafter in order.

Figure 4:
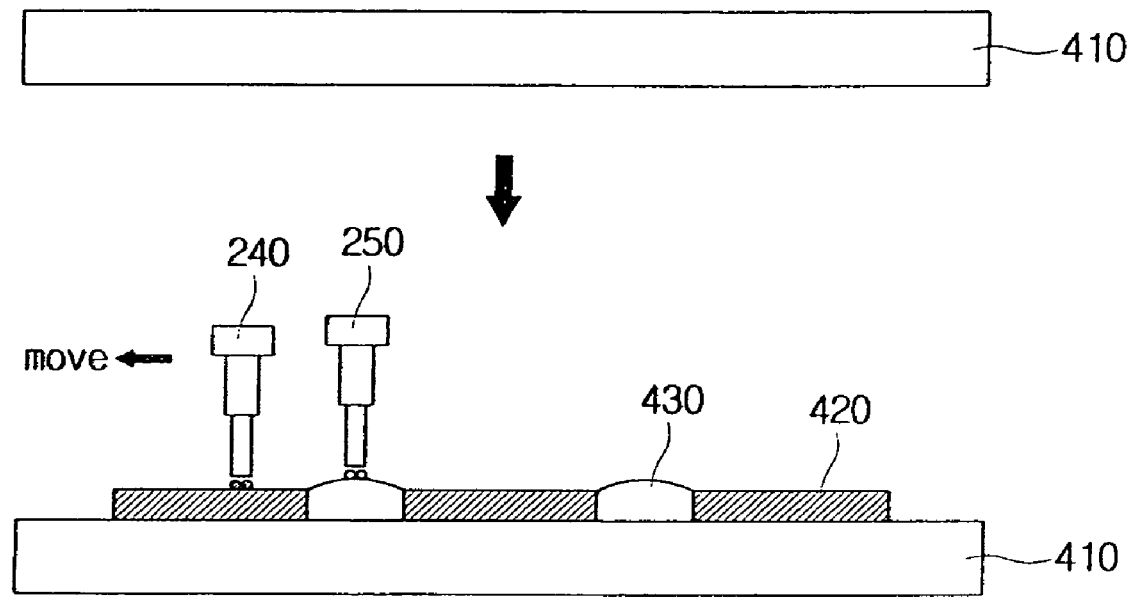
FIG. 4 illustrates internal electrodes and a dielectric printed simultaneously by an inkjet technique according to a first preferred embodiment of the invention.

FIG. 4 illustrates internal electrodes and an interelectrode dielectric formed simultaneously on a dielectric film by an inkjet technique according to a first preferred embodiment of the invention. FIG. 4 illustrates a dielectric film 410 formed by using a slurry including dielectric powder, dispersing agents, and binders, or formed by an inkjet printer head 240 intended for electrodes and an inkjet printer head 250 intended for dielectrics. After forming the dielectric film 410, internal electrodes 420 and an interelectrode dielectric 430 are formed on the dielectric film 410 using the inkjet printer head 240 for electrodes and the inkjet printer head 250 for dielectrics. The dielectric film 410 may be formed by conventional methods of batch processes and casting processes. The internal electrodes 420 and the interelectrode dielectric 430 are formed by ink intended for internal electrodes and ink intended for dielectrics sprayed from the inkjet printer heads according to a preconfigured pattern. Here, the ink used for the interelectrode dielectric 430 may contain the same or different binders and solvents as the slurry used for the dielectric film 410.

Various implementations are possible in the production method for each multi-layer ceramic capacitor. For example, a multi-layer ceramic capacitor may be formed by stacking, compressing, and cutting the dielectric sheets on which the internal electrodes 420 and the interelectrode dielectric 430 are printed simultaneously according to a preconfigured pattern. In another embodiment, the internal electrodes 420 and the interelectrode dielectric 430 may be printed for each chip, and a dielectric film may be formed on the upper portion thereof, after which the process of printing the internal electrodes 420 and interelectrode dielectric 430 on the upper portion thereof may be repeated continuously to form a multi-layer ceramic capacitor.

In yet another embodiment, the dielectric film 410 may not be formed by conventional casting methods but may instead be formed by an inkjet technique. For instance, the dielectric film 410 may be formed by an inkjet technique in the first phase of the process, and the internal electrodes 420 and the interelectrode dielectric 430 may be formed simultaneously on the dielectric film 410 by an inkjet technique in the second phase. Here, the dielectric film 410 may be formed by the inkjet printer head 250 for dielectrics as set forth above, or may be formed by a separate inkjet printer head intended for the dielectric film. In addition, in a further embodiment, the dielectric film 410 may be formed using dielectric slurry in the first phase of the process, and the internal electrodes 420 and the interelectrode dielectric 430 may be formed simultaneously on the dielectric film 410 by an inkjet technique while the dielectric film is half dry.

Figure 5:
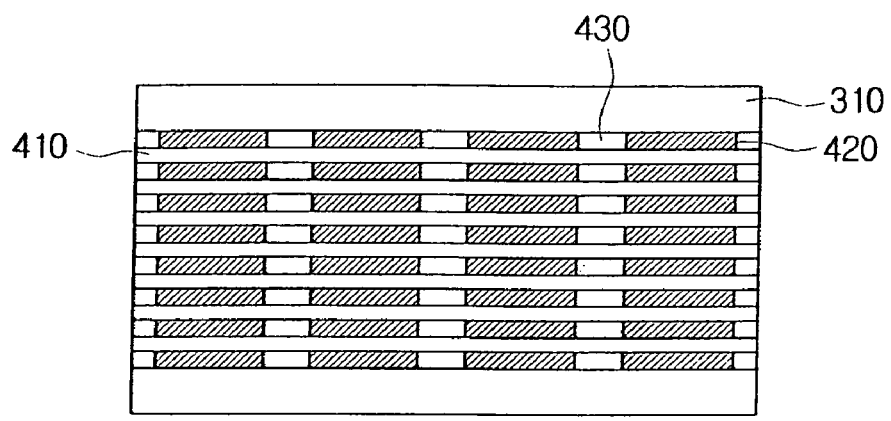
FIGS. 5 and 6 are cross sectional views of an array type multi-layer ceramic capacitor according to the first preferred embodiment of the invention.
Figure 6:
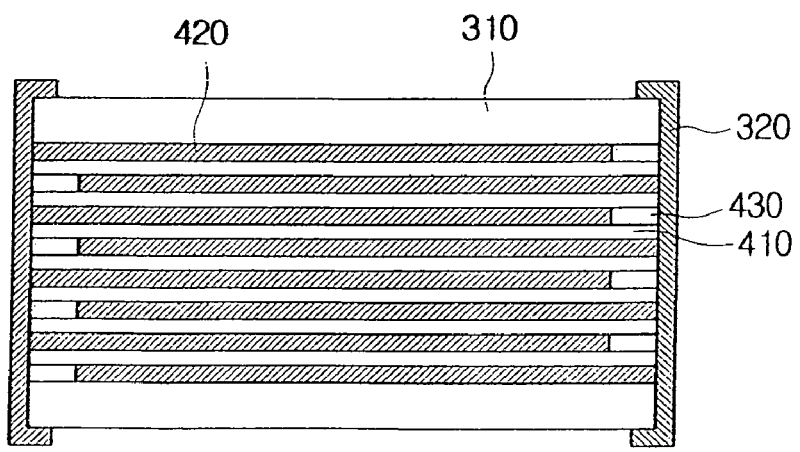

FIG. 5 is a cross sectional view across line (a) of FIG. 3, and FIG. 6 is a cross sectional view across line (b) of FIG. 3. As seen in FIG. 5, by vertically stacking the internal electrodes 410, the array type multi-layer ceramic capacitor comprises four separate multi-layer ceramic capacitors. In FIG. 6, it is seen that the internal electrodes 420 are stacked alternately for each layer so that each is electrically connected to a different external electrode. Here, the interelectrode dielectrics 430 has been shaded to differentiate from the interlayer gaps illustrated in FIG. 1, and since they are formed in-between the internal electrodes 420, they may remove the interlayer gaps between internal electrodes 420 formed when using conventional methods.

Figure 7:
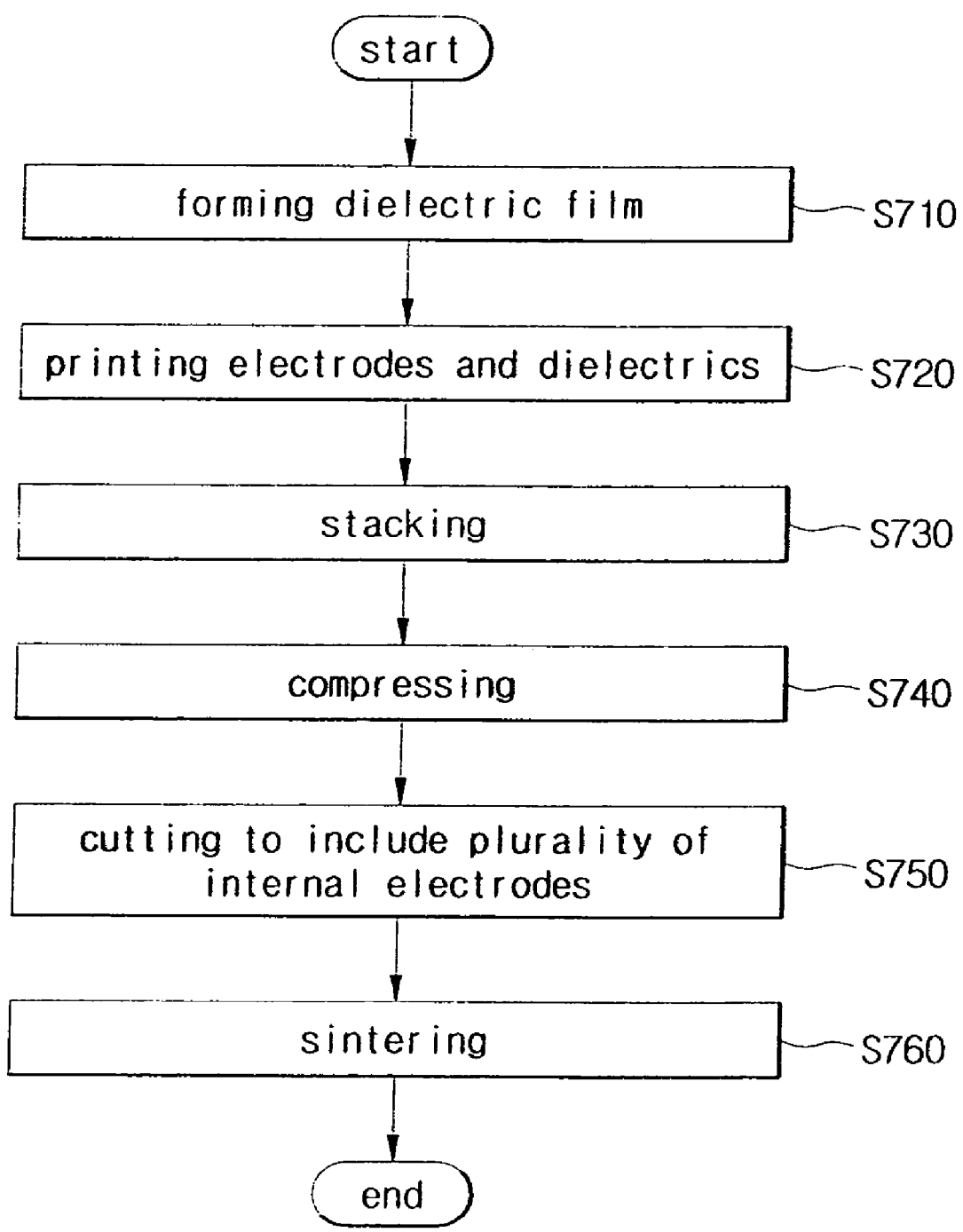
FIG. 7 is a flowchart illustrating a production method of an array type multi-layer ceramic capacitor according to the first preferred embodiment of the invention.

FIG. 7 is a flowchart illustrating a production method of an array type multi-layer ceramic capacitor according to the first preferred embodiment of the invention.

In step S710, the dielectric films are formed by using slurry or by the inkjet printer head 240 for electrodes and the inkjet printer head 250 for dielectrics.

In step S720, the internal electrodes 420 and the interelectrode dielectrics 430 are printed according to a preconfigured pattern using the inkjet printer head 240 for electrodes and the inkjet printer head 250 for dielectrics.

The dielectric sheets, on each of which the internal electrodes 420 and the interelectrode dielectric 430 are printed, are stacked in a predetermined number in step S730, compressed in step S740, and then cut horizontally, in other words cut into chips to include a plurality of internal electrodes on the same plane as the dielectric sheet in step S750. Afterwards, the chips thus formed are sintered in step S760, and a plating process is applied to produce the array type multi-layer ceramic capacitors in units of chips.

Figure 8:
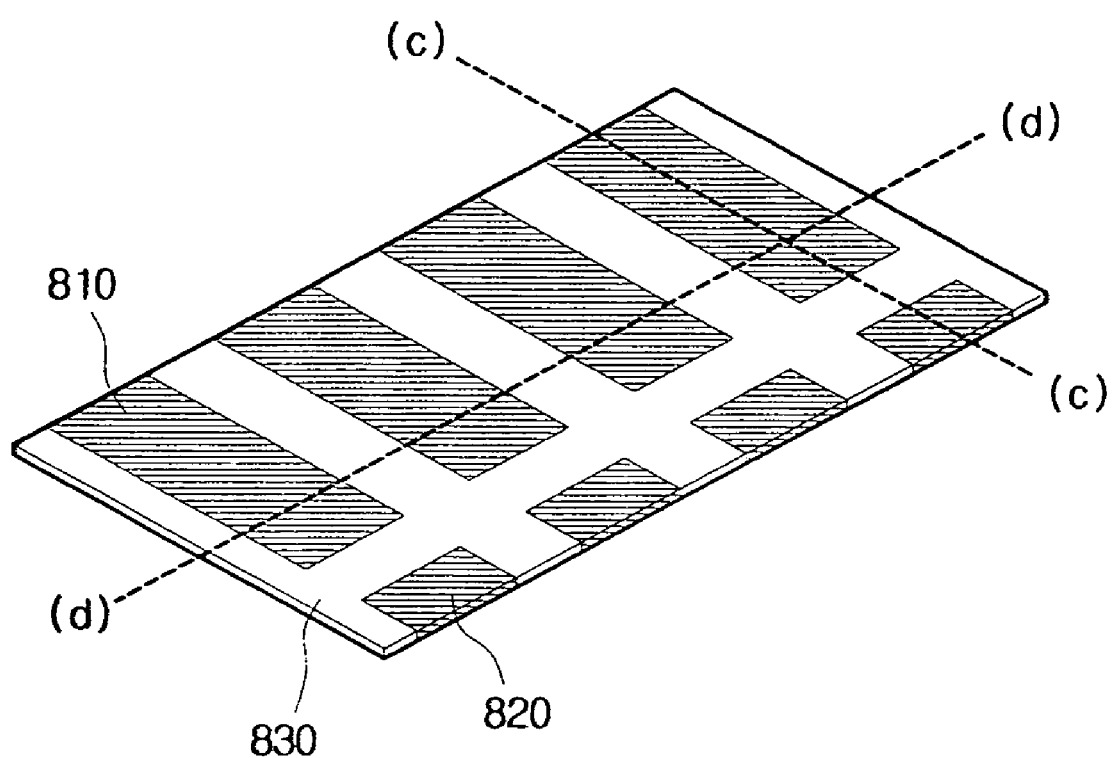
FIG. 8 is a perspective view of a dielectric sheet in an array type multi-layer ceramic capacitor according to a second preferred embodiment of the invention.
Figure 9:
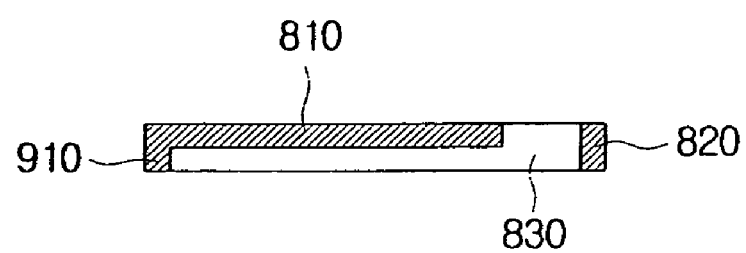
FIGS. 9 and 10 are cross sectional views of a dielectric sheet in an array type multi-layer ceramic capacitor according to the second preferred embodiment of the invention.
Figure 10:
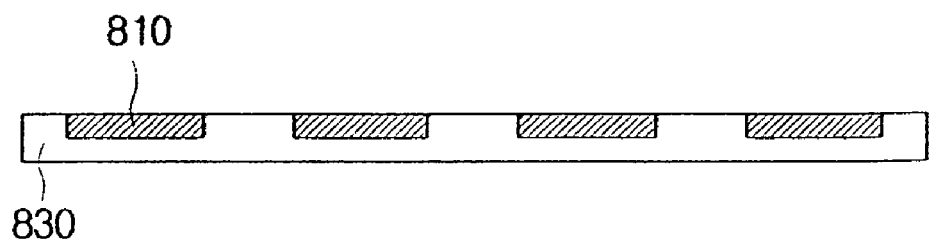

FIG. 8 is a perspective view of a dielectric sheet in an array type multi-layer ceramic capacitor according to a second preferred embodiment of the invention, FIG. 9 is a cross sectional view across line (c) of FIG. 8, and FIG. 10 is a cross sectional view across line (d) of FIG. 8.

In FIGS. 8 to 10 are illustrated external electrodes 820, 910, a dielectric 830 and internal electrodes 810. Since the internal electrodes 810 and the external electrodes 910 are formed by an inkjet technique as a single body, the problem of poor contact may be resolved. Here, the internal electrodes 810 and the external electrodes 820, 910 may be formed from the same kind of metal material, or may be formed from different metal materials according to the inkjet printing program. If the internal electrodes 810 and the external electrodes 820, 910 are formed from different kinds of metal material, the inkjet printer head 240 for electrodes may be implemented in two ways. That is, one inkjet printer head for electrodes may move according to a preconfigured pattern and spray ink for internal electrodes in internal electrode sections and spray ink for external electrodes in external electrode sections. In another method, the inkjet printer head 240 for electrodes may comprise an inkjet printer head for internal electrodes and an inkjet printer head 240 for external electrodes, and may print the internal electrodes and the external electrodes by spraying the ink for internal electrodes and ink for external electrodes, respectively.

The array type multi-layer ceramic capacitor is formed when the dielectric sheets, on each of which the electrodes and the dielectric are printed simultaneously, are stacked after alternately being moved by an offset value, or are stacked after alternately being rotated by 180°. That is, the array type multi-layer ceramic capacitor is formed by moving the dielectric sheets by an offset value or rotating the dielectric sheets about an axis passing the centers of the dielectrics, and stacking the dielectric sheets in a predetermined number so that the external electrodes 820 of a lower dielectric sheet and the external electrodes 910 of an upper dielectric sheet are superposed. Thus, since the external electrodes 820 of a lower dielectric sheet and the external electrodes 910 of an upper dielectric sheet are superposed, the contact problem is prevented. Here, the dielectric is subsided with a portion thereof having a face exposed and is joined with an external electrode 820 at an unexposed side and joined to another external electrode 910 at the exposed side. Also, the dielectric of a lower dielectric sheet and the dielectric of an upper dielectric sheet are in contact with each other to act as an interlayer dielectric in the multi-layer ceramic capacitor. If more than half of the dielectric is subsided in the horizontal direction, parts of the internal electrodes 810 formed in the subsided portions are superposed with a dielectric positioned in-between, when the dielectric sheets are stacked to be laterally symmetrical. Therefore, the superposed parts of the internal electrodes 810 act as electrodes in the multi-layer ceramic capacitor.

Figure 11:
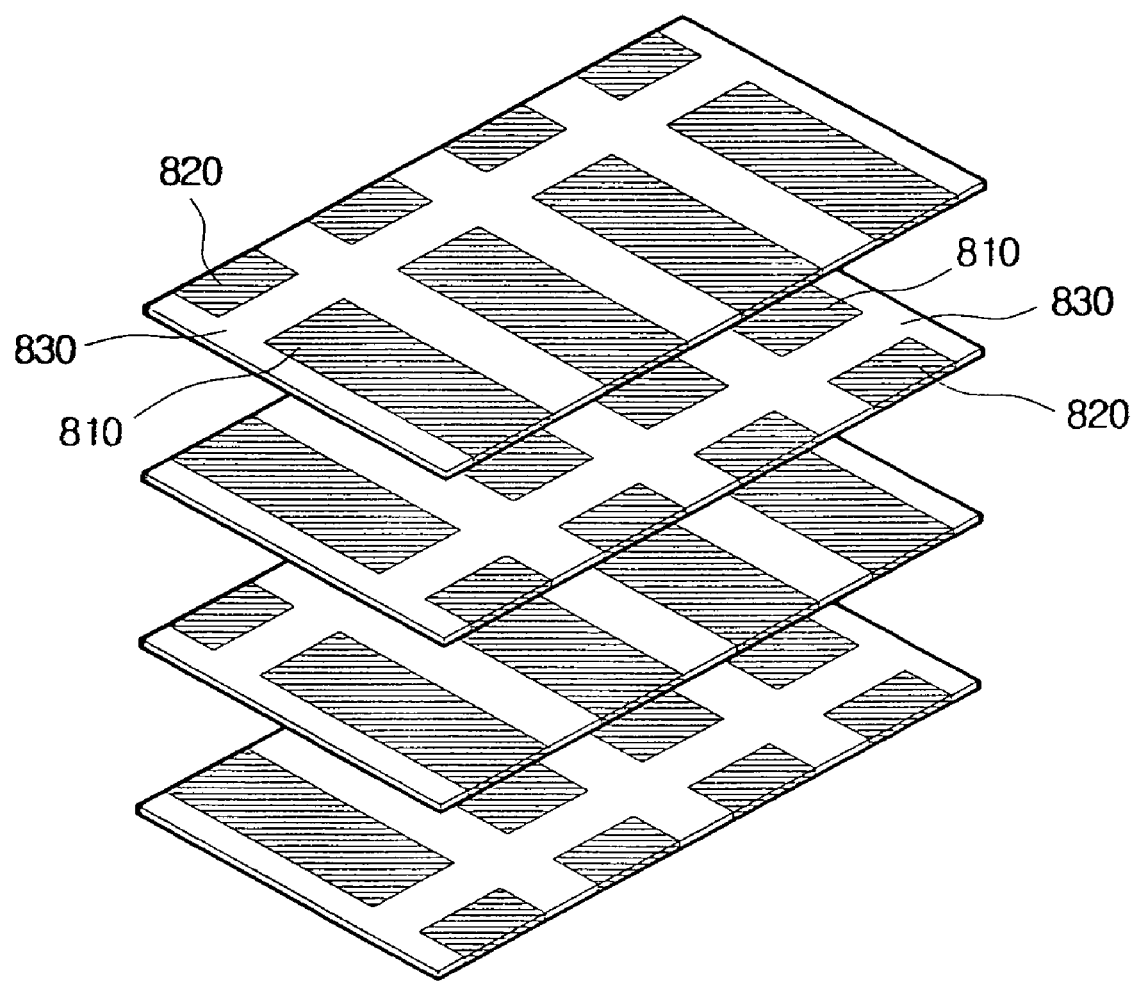
FIG. 11 illustrates the multi-layer composition of an array type multi-layer ceramic capacitor according to the second preferred embodiment of the invention.
Figure 12:
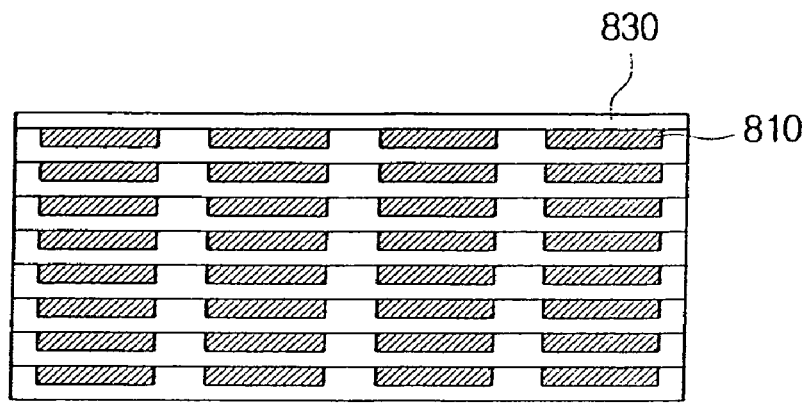
FIGS. 12 and 13 are cross sectional views an array type multi-layer ceramic capacitor according to the second preferred embodiment of the invention.
Figure 13:
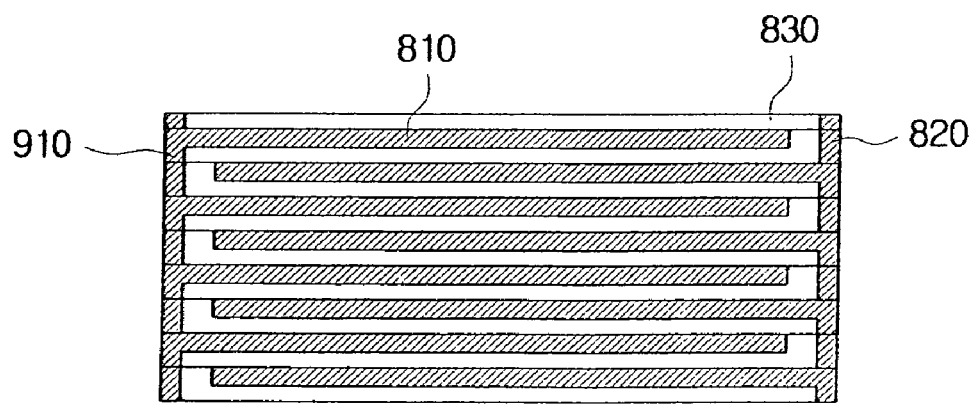

FIG. 11 illustrates a multi-layer composition of an array type multi-layer ceramic capacitor according to the second preferred embodiment of the invention, FIG. 12 is a cross sectional view across line (a) of FIG. 3, and FIG. 13 is a cross sectional view across line (b) of FIG. 3.

In FIG. 11, the internal electrodes 810 and the external electrodes 820 are stacked to be laterally symmetrical after alternately being moved by an offset value or after alternately being rotated by 180°.

Here, the array type multi-layer ceramic capacitor may be produced by printing a plurality of electrodes and dielectrics according to a preconfigured pattern and cutting in accordance with the pattern. That is, the array type multi-layer ceramic capacitors may be mass-produced by printing a plurality of comb-shaped electrodes and straight electrodes formed between the comb-shaped electrodes and then cutting to include a predetermined number of internal electrodes. Here, the protrusion parts of the comb shapes are the internal electrodes 810, the bodies of the comb shapes are a set of external electrodes 910, and the straight electrodes formed between the comb-shaped electrodes are another set of external electrodes 820. By stacking the dielectric sheets in a predetermined number so that the external electrodes 820 of an upper dielectric sheet meet the external electrodes 910 of a lower dielectric sheet and cutting in accordance with the pattern, a multi-layer ceramic capacitor with alternating internal electrodes may be obtained. Here, the cutting line by which the dielectric sheets are cut are parallel to each of the external electrodes 820, 910 and bisect these external electrodes 820, 910.

The array type multi-layer ceramic capacitor may be produced by forming the dielectric sheets by an inkjet technique on carrier film and then stacking the dielectric sheets thus formed. In another embodiment, the array type multi-layer ceramic capacitor may be produced by forming the dielectric sheets by an inkjet technique and repeating by a predetermined number of times to form dielectric sheets by the inkjet technique on top of the dielectric sheet thus formed. In the latter case, the dielectric sheets are stacked while the dielectrics are half dry, so that there is an advantage of strong adhesion between the dielectric sheets.

FIG. 12 shows internal electrodes 810 formed between the dielectrics 830, and is similar to the cross sectional view illustrated in FIG. 5. However, as shown in FIG. 13, the external electrodes 820, 910 are printed simultaneously with the internal electrode 810 and the dielectric 830, so that no additional process of creating the external electrodes 820, 910 is necessary.

Figure 14:
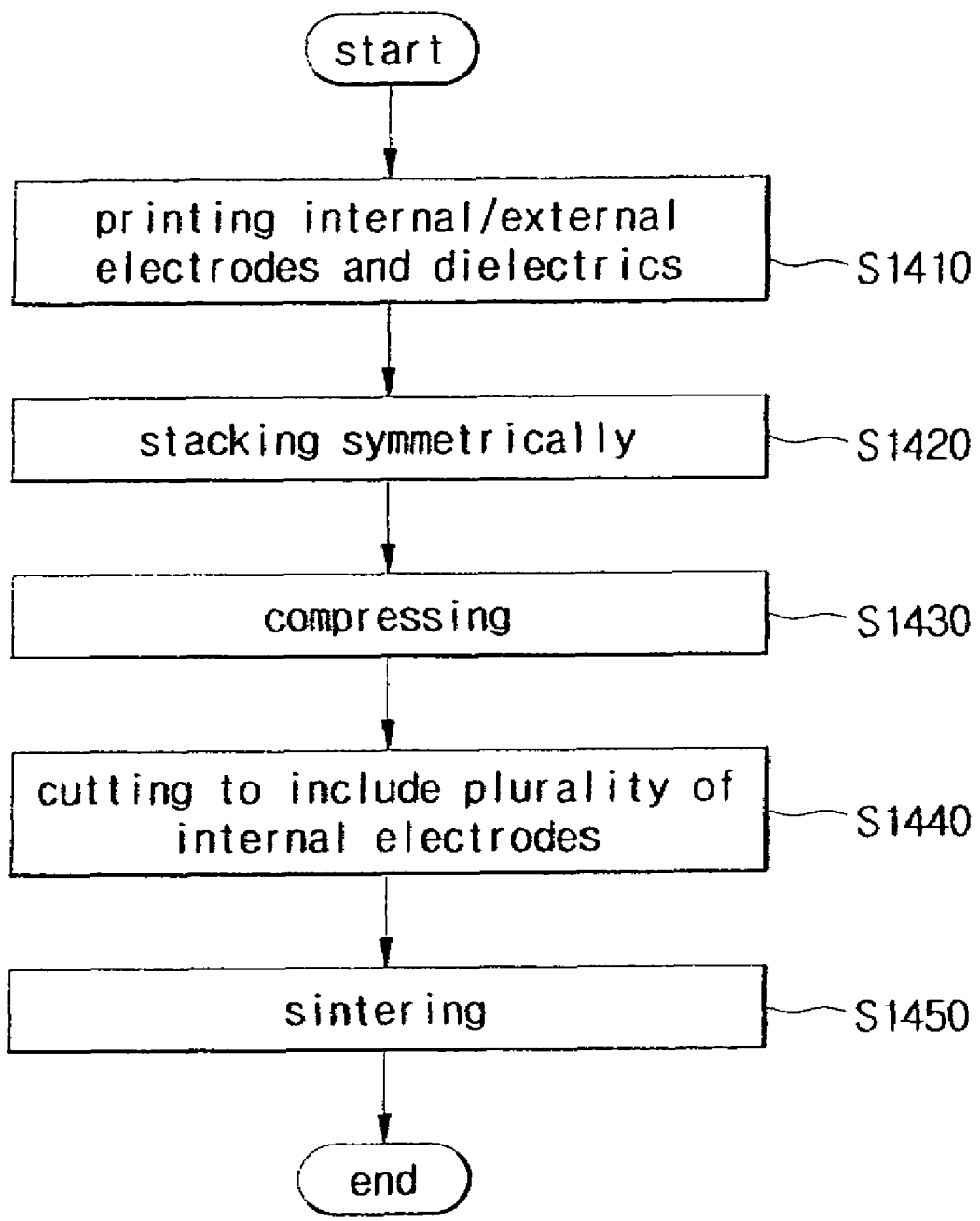
FIG. 14 is a flowchart illustrating a production method of an array type multi-layer ceramic capacitor according to the second preferred embodiment of the invention.

FIG. 14 is a flowchart illustrating a production method of an array type multi-layer ceramic capacitor according to the second preferred embodiment of the invention.

In step S1410, the external electrodes 820, 910, internal electrodes 810 and dielectrics 830 are printed using the inkjet printer head 240 for electrodes and the inkjet printer head 250 for dielectrics according to a preconfigured pattern.

The dielectric sheets, on each of which the external electrodes 820, 910, internal electrodes 810 and dielectrics 830 are printed, are stacked alternately and symmetrically in a predetermined number in step S1420, compressed in step S1430, and then cut horizontally, in other words cut into chips to include a plurality of internal electrodes on the same plane as the dielectric sheet in step S1440. Afterwards, the chips thus formed are sintered in step S1450, and a plating process is applied to produce the array type multi-layer ceramic capacitors in units of chips.

The invention is not limited to the foregoing embodiments, and the skilled person will understand that numerous variations may be made without departing from the spirit of the invention.

The array type multi-layer ceramic capacitor and production method according to the invention as set forth above can solve the problem of interlayer gaps by printing the dielectrics and internal electrodes simultaneously.

Also, the array type multi-layer ceramic capacitor and production method according to the invention can improve adhesion between the dielectric sheets during stacking.

Further, the array type multi-layer ceramic capacitor and production method according to the invention can solve the contact problem by printing internal electrodes and external electrodes as single bodies.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of producing an array type multi-layer ceramic capacitor comprising:
   (a) forming dielectric films;
   (b) forming dielectric sheets, on which internal electrodes and interelectrode dielectrics formed on the same plane as the internal electrodes are printed simultaneously by spraying ink intended for internal electrodes and ink intended for dielectrics onto the dielectric film via a plurality of inkjet printer heads;
   (c) stacking and compressing the dielectric sheets;
   (d) cutting the stacked dielectric sheet to include a plurality of internal electrodes on the same plane as the dielectric sheet; and
   (e) sintering the cut dielectric sheets,
   wherein the plurality of inkjet printer heads comprise:
   an inkjet printer head intended for internal electrodes which sprays the ink intended for internal electrodes; and
   an inkjet printer head intended for dielectrics which sprays the ink intended for dielectrics.

2. The method set forth in claim 1, wherein during the forming of the dielectric films (a), the dielectric films are formed using dielectric slurry.

3. The method set forth in claim 1, wherein during the forming of the dielectric films (a), the dielectric films are formed by spraying dielectric ink using the inkjet printer heads.

4. The method set forth in claim 1, wherein cutting lines by which the dielectric sheet is cut are parallel to the internal electrodes and bisect the interelectrode dielectrics.

5. The method set forth in claim 1, wherein during the cutting (d), the number of internal electrodes included in the same plane as the dielectric sheet is two or four.

6. The method set forth in claim 1, wherein the inkjet printer head intended for internal electrodes and the inkjet printer head intended for dielectrics spray ink while moving synchronously.

7. The method set forth in claim 1, wherein the inkjet printer head intended for internal electrodes and the inkjet printer head intended for dielectrics spray ink while moving separately in correspondence to different operational control signals.

8. A method of producing an array type multi-layer ceramic capacitor comprising:
   forming dielectric sheets, on each of which are printed a first external electrode, a dielectric joined to the first external electrode and subsided with a face thereof exposed, an internal electrode formed in the subsided portion of the dielectric, and a second external electrode formed to join as a single body with the internal electrode;
   stacking and compressing the dielectric sheets alternately so that the first external electrodes and the second external electrodes are symmetrical and thus electrically connected with each other;
   cutting the stacked dielectric sheet to include a plurality of the internal electrodes on the same plane as the dielectric sheet; and
   sintering the cut dielectric sheets.

9. The method as set forth in claim 8, wherein the first external electrode, the dielectric, the internal electrode, and the second external electrode are printed simultaneously by an inkjet technique.

10. The method as set forth in claim 9, wherein the inkjet technique is a technique of spraying ink intended for electrodes and ink intended for dielectrics using a plurality of inkjet printer heads.

11. The method as set forth in claim 8, wherein the first external electrode, the internal electrode, and the second external electrode are formed with different types of material.

12. The method set forth in claim 8, wherein the number of internal electrodes included in the same plane as the dielectric sheet is two or four.

* * * * *